MERCHANT & PATTERSON.
Coffee Pot.
No. 22,816.
Patented Feb. 1, 1859.
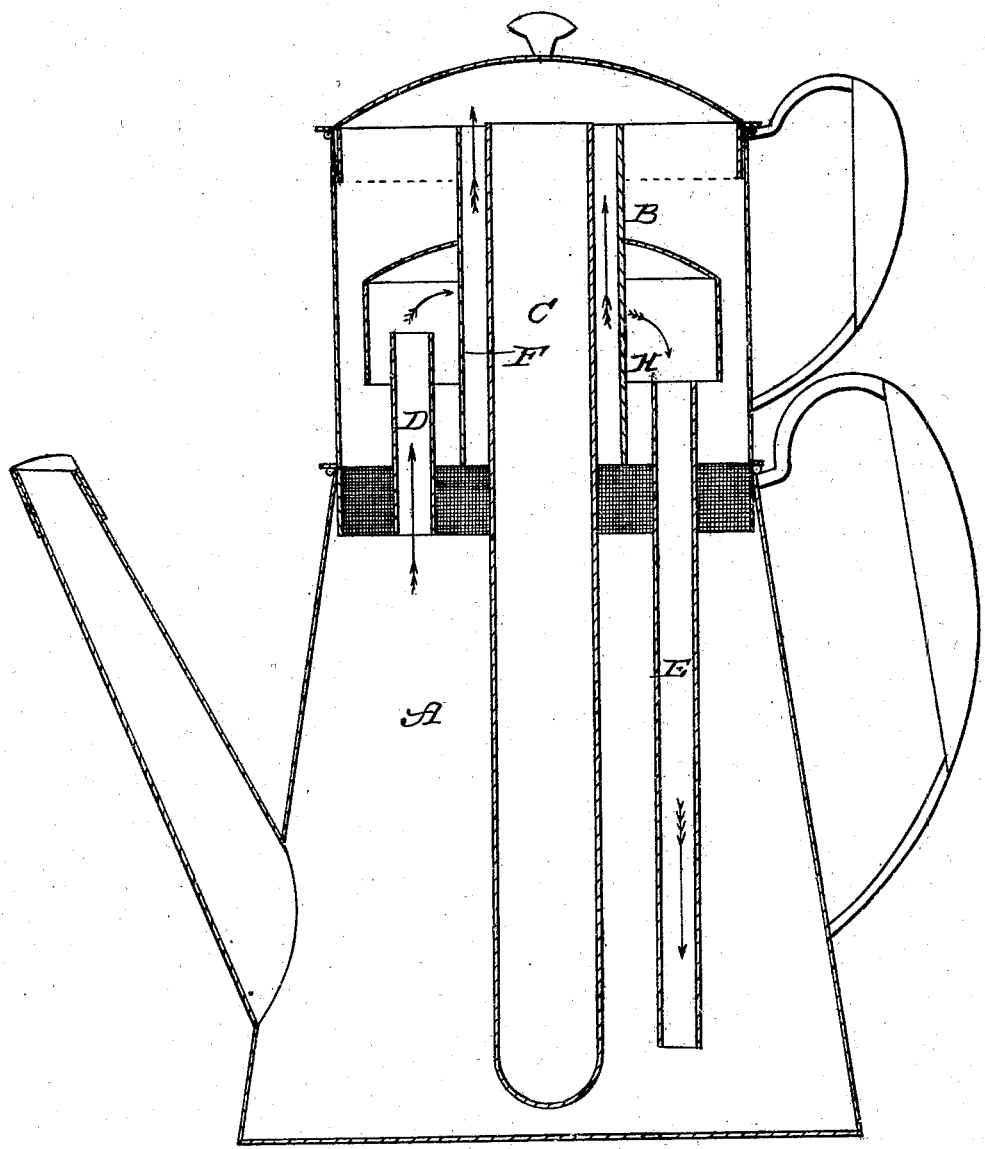

UNITED STATES PATENT OFFICE.

C. A. MERCHANT AND G. L. PATTERSON, OF FRANKFORT, KENTUCKY.

COFFEE-POT.

Specification of Letters Patent No. 22,816, dated February 1, 1859.

*To all whom it may concern:*

Be it known that we, C. A. MERCHANT and G. L. PATTERSON, of Frankfort, in the county of Franklin, in the State of Kentucky, have invented a new and useful Invention in Coffee-Boilers; and we do hereby declare that the following is a full, clear, and exact description of the construction and operation of the same, reference being had to the annexed drawings, making a part of this specification, in which is represented a longitudinal section of the coffee-pot in elevation.

A, boiler; B, reservoir; H, cylinder; C, tube; E, tube; D, tube, and F tube.

The construction and operation of our invention is as follows: The boiler A is filled with hot water and coffee. The reservoir B is placed on the top and filled with cold water; a red hot iron is then put into the tube C. As soon as steam generates in the boiler A, it passes through tube D into cylinder H, and is there condensed and returned back to the coffee boiler through tube E. Thus all the aroma which would otherwise escape with the steam is preserved. The bottom of the reservoir B being filled prevents the water in it from being heated save by the steam passing through tube D into cylinder H. Tube F passes from top to bottom of reservoir and encircles tube C, which prevents the iron in tube C from heating the water in the reservoir. Thus the water in the reservoir remains cold until the coffee is made.

We do not claim a reservoir containing cold water, as such is well known, but,

What we claim as our invention, and desire to secure by Letters Patent is—

The combination and arrangement of the cylinder H, in the reservoir B, with the tubes D, E, and F, C, in the manner and for the purpose hereinbefore described.

C. A. MERCHANT.
G. L. PATTERSON.

Witnesses:
F. C. SMITH,
W. H. CRESSY.